Nov. 23, 1937.  J. E. TUSCHER ET AL  2,099,913
AUTOMATIC TELEPHONE SIGNALING APPARATUS
Filed Sept. 20, 1934    7 Sheets-Sheet 1
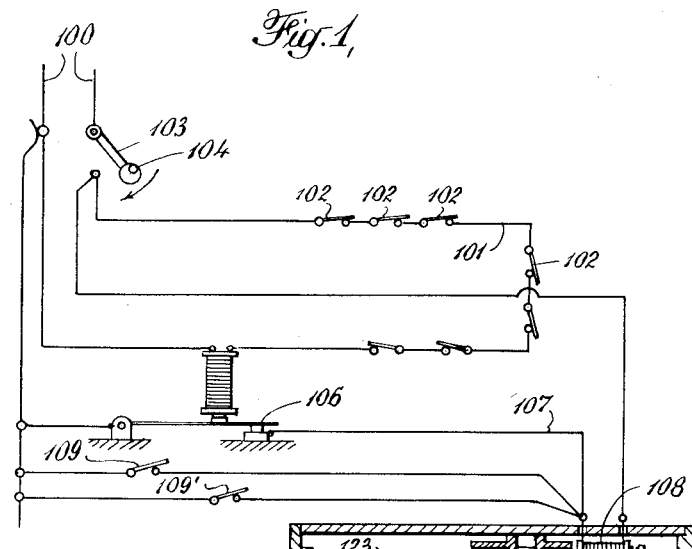
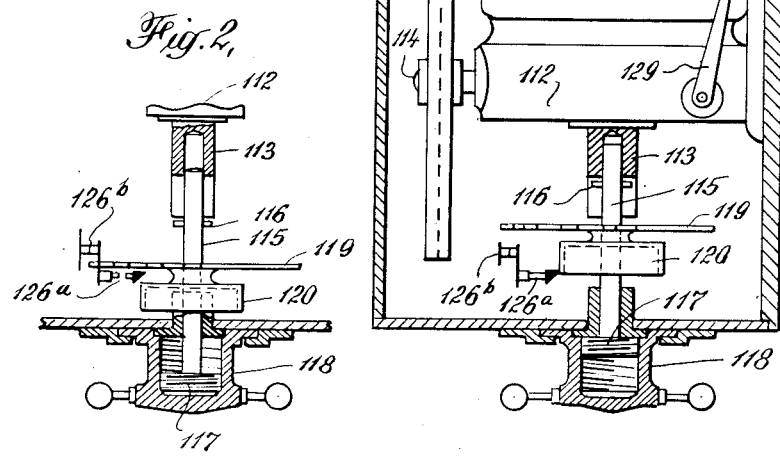
INVENTORS
JEAN E. TUSCHER &
MARCEL SPIRO
BY
ATTORNEYS

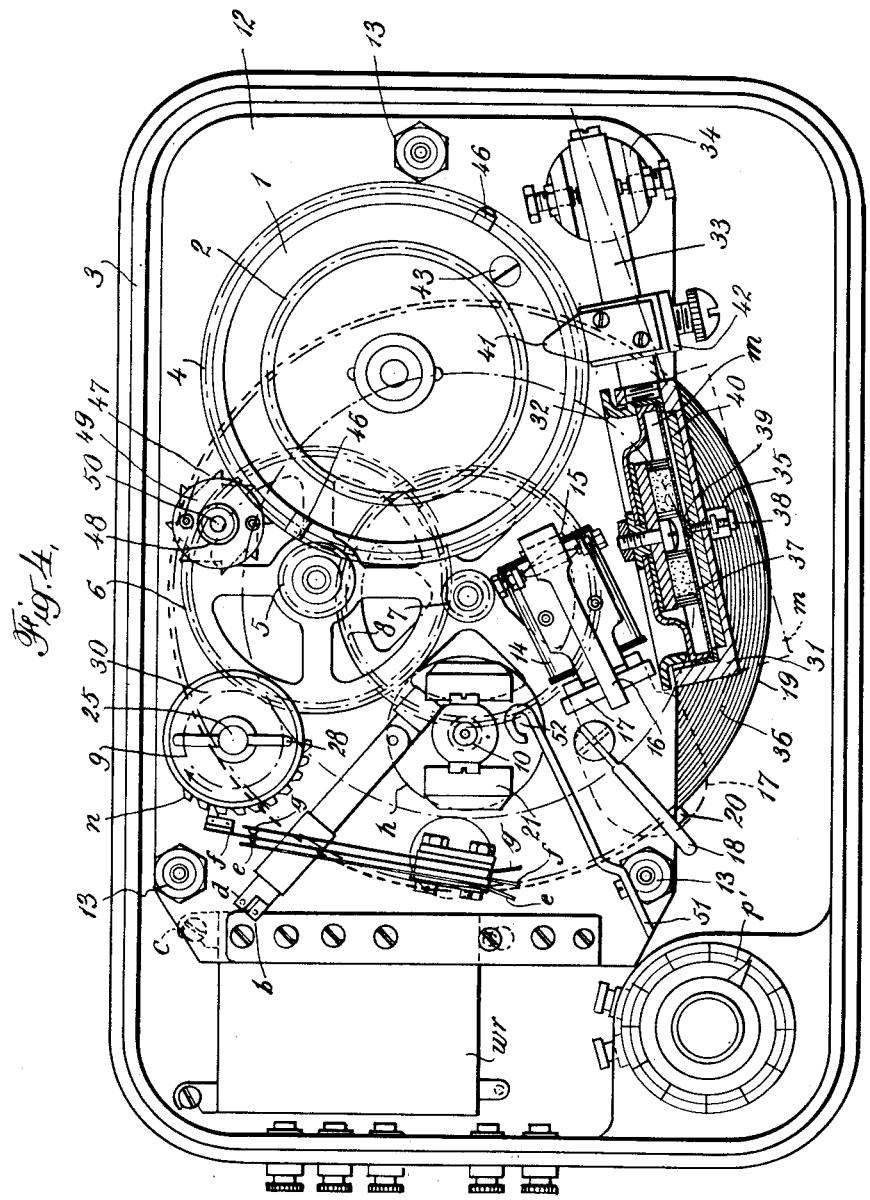

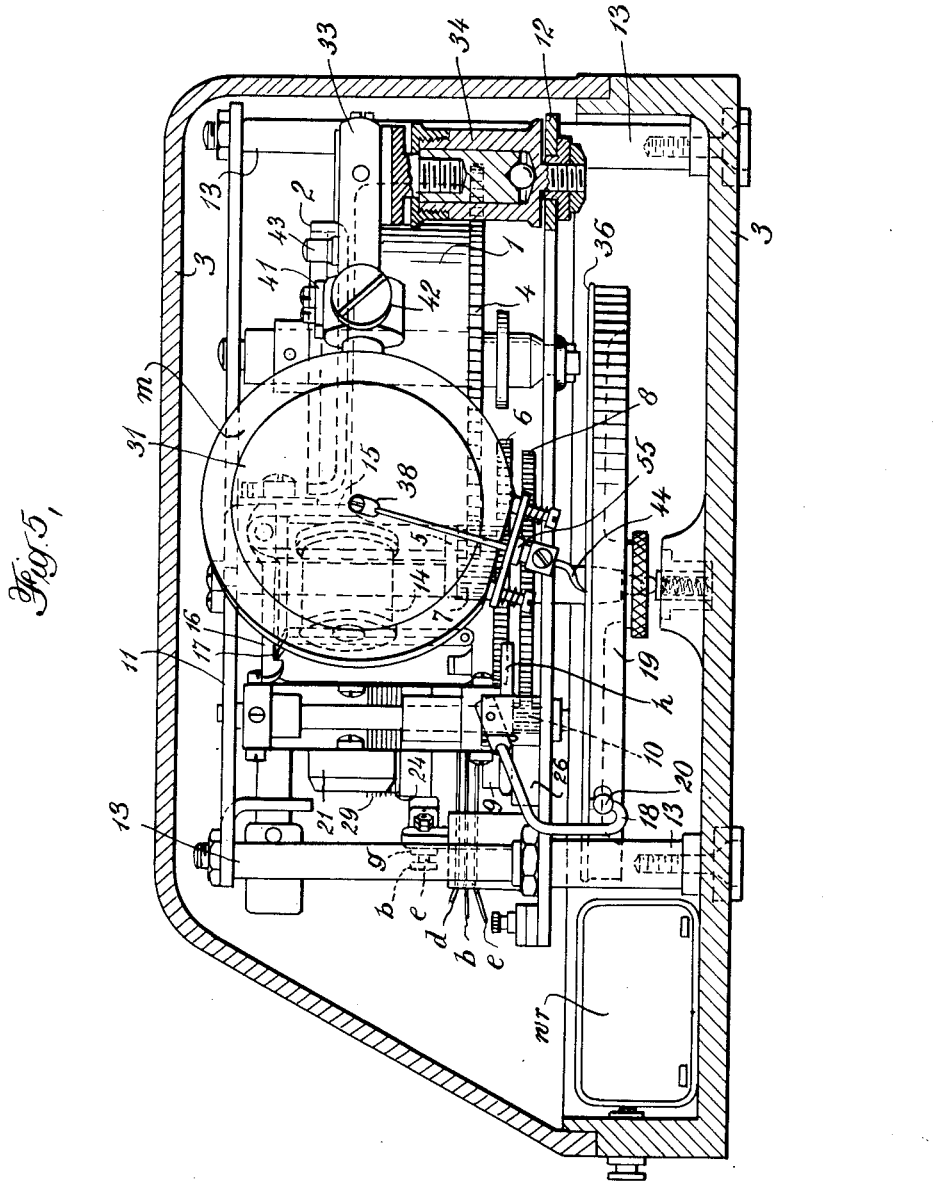

Nov. 23, 1937.    J. E. TUSCHER ET AL    2,099,913
AUTOMATIC TELEPHONE SIGNALING APPARATUS
Filed Sept. 20, 1934    7 Sheets-Sheet 5
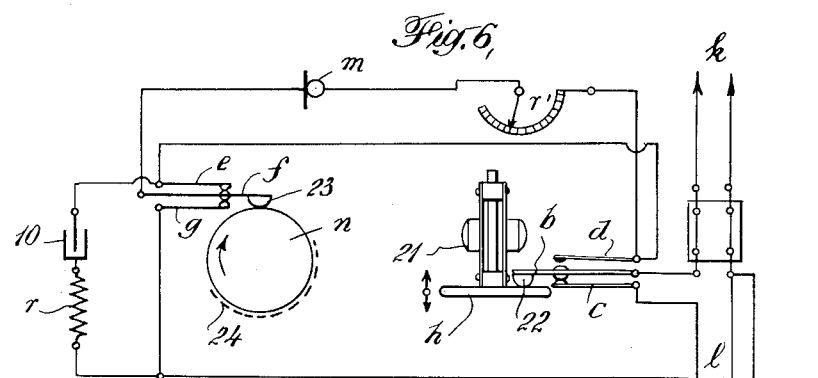
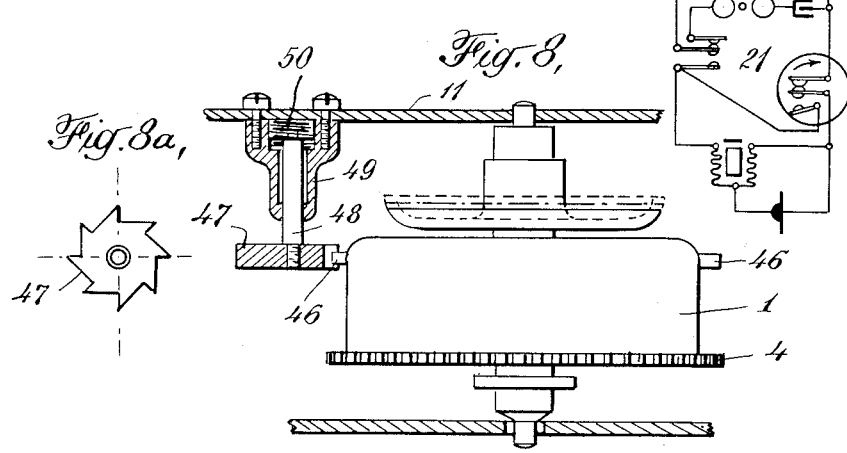
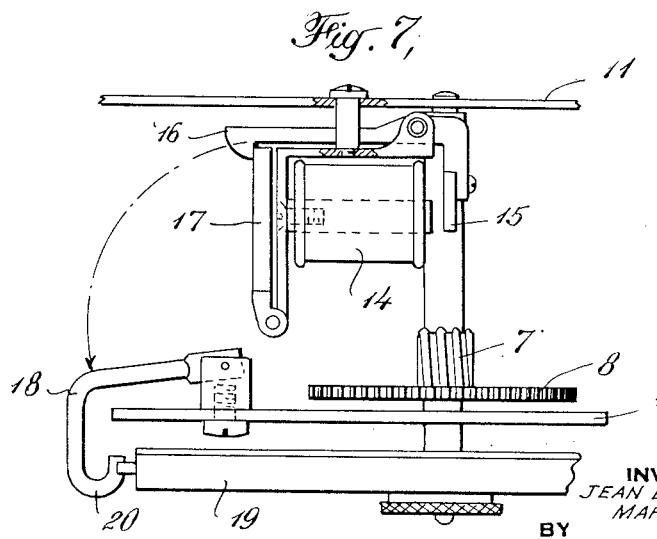
INVENTORS
JEAN E. TUSCHER &
MARCEL SPIRO
BY
ATTORNEYS Nov. 23, 1937.  J. E. TUSCHER ET AL  2,099,913
AUTOMATIC TELEPHONE SIGNALING APPARATUS
Filed Sept. 20, 1934    7 Sheets-Sheet 6
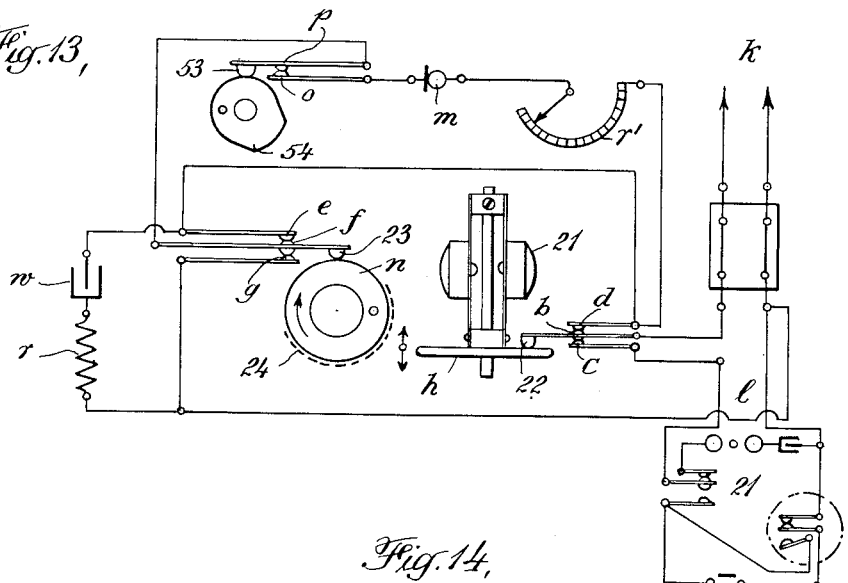
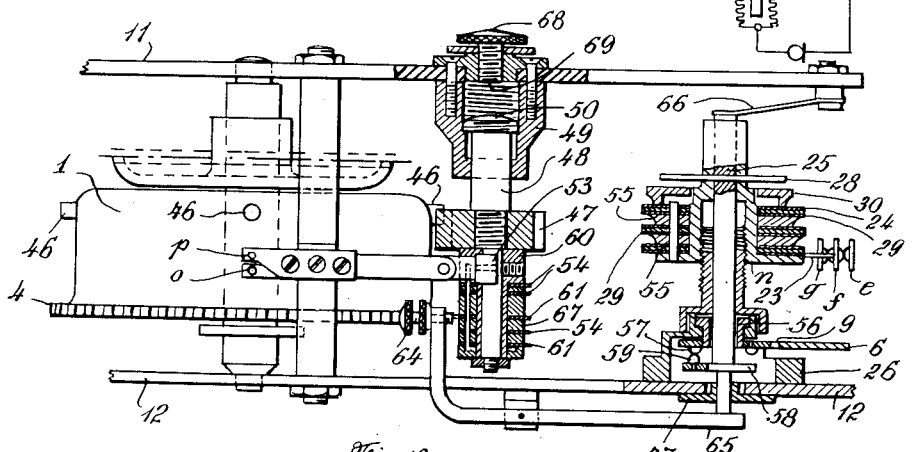
INVENTORS
JEAN E. TUSCHER
MARCEL SPIRO
BY
ATTORNEYS Nov. 23, 1937.  J. E. TUSCHER ET AL  2,099,913
AUTOMATIC TELEPHONE SIGNALING APPARATUS
Filed Sept. 20, 1934  7 Sheets-Sheet 7
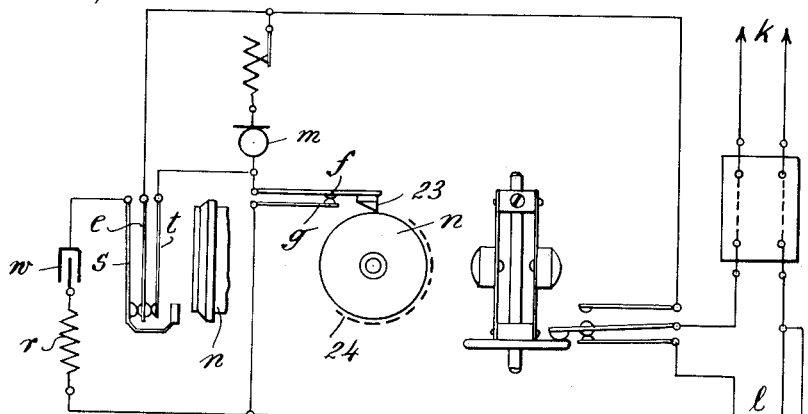
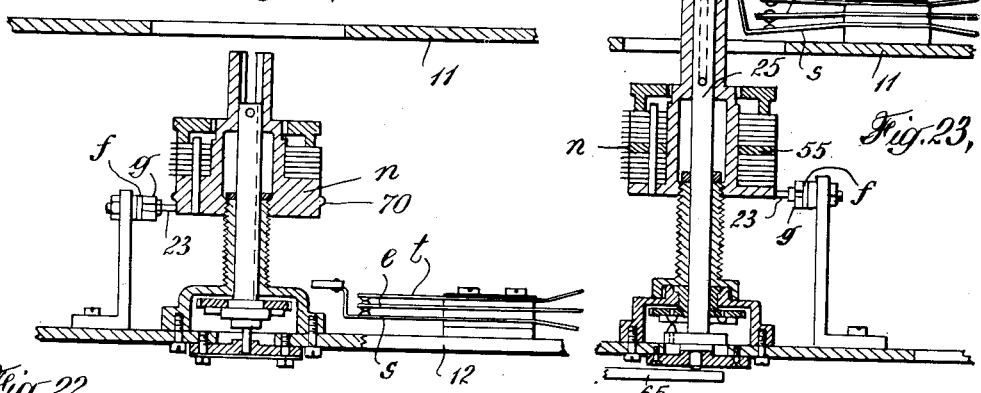
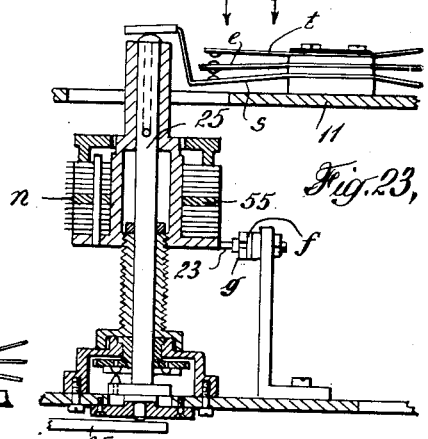
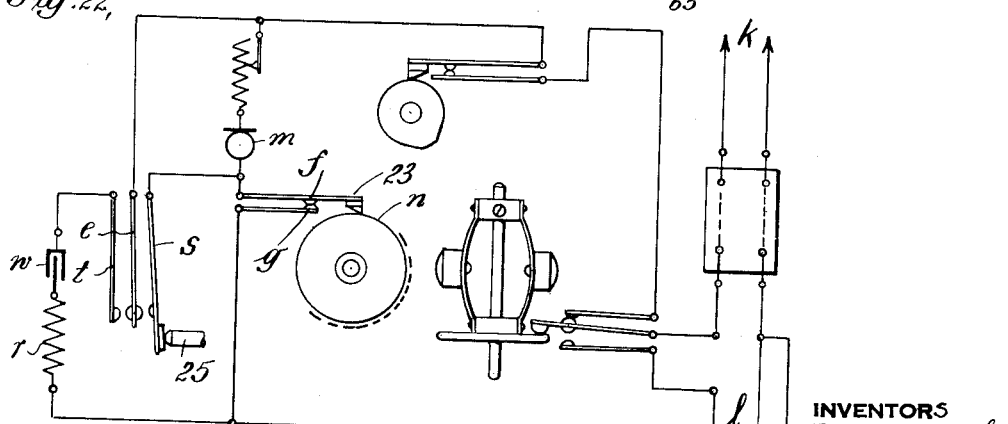
INVENTORS
JEAN E. TUSCHER &
MARCEL SPIRO
BY
ATTORNEY Patented Nov. 23, 1937

2,099,913

UNITED STATES PATENT OFFICE 2,099,913

AUTOMATIC TELEPHONE SIGNALING APPARATUS

Jean Edouard Tuscher, Petit Ivry, and Marcel Spiro, Paris, France, assignors, by mesne assignments, to Signaphone Corporation of America, Wilmington, Del., a corporation of Delaware Application September 20, 1934, Serial No. 744,834
In France December 6, 1931

10 Claims. (Cl. 179—5)

This invention relates to protective alarm systems for buildings, adapted automatically to transmit an alarm message telephonically, and more especially to systems of this character capable of operating in conjunction with a subscriber's telephone line terminating at an automatic exchange.

This application is a continuation in part of our copending application Serial No. 645,846, filed December 5, 1932.

An object of the invention is the provision of a protective system for association with a dial actuated subscriber's telephone line which, upon occurrence of conditions requiring that an alarm be given, will automatically dial a preselected station and transmit an alarm message phonographically thereto.

A feature of the invention is the optional incorporation therein of means whereby the alarm apparatus will dial in sequence two or more preselected stations and transmit the alarm message phonographically to each. This same modification permits of calling stations several times in succession to guard against the contingency of a busy line.

The apparatus whereby these results are achieved is reliable of operation and of compact structure. The employment therein of a microphone pick-up for translating the stylus vibrations directly into electrical oscillations, assures such silent operation in giving the alarm as not to warn an intruder. To further this end the alarm mechanism which is separate and apart from the subscriber's telephone set, may be housed in a sound-proof casing, and placed out of sight, as for example, in a desk drawer, etc.

In the drawings:

Fig. 1 is a composite showing of the electrical protective circuits and cooperating mechanical features illustrating the principles of operation for a modification of the invention actuated from an electrically driven motor.

Fig. 2 is a sectional elevation of the dialling mechanism incorporated in the Fig. 1 structure.

Figs. 4–13 inclusive show a second modification of the invention actuated by a mechanically driven motor.

Figs. 4 and 5 show in plan view and sectional elevation the mechanical details of this construction.

Fig. 6 is a wiring diagram of the telephone connections.

Fig. 7 is a detail showing the mechanical features of the starting device.

Figs. 8 and 8a are details illustrating the mechanism for stopping the device.

Figure 10:
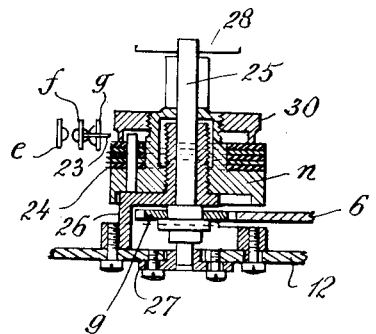
Figure 9:
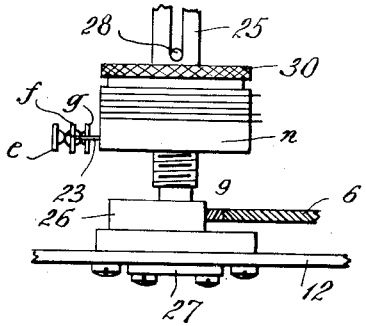

Figs. 9 and 10 are respectively an elevation and a sectional elevation of the cam actuated dialling mechanism.

Figure 11:
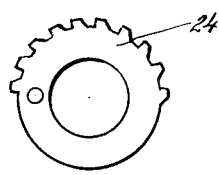
Figure 12:
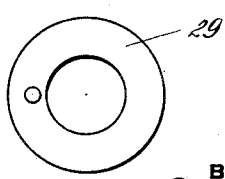

Fig. 11 illustrates an individual dialling cam, and Fig. 12 an annular blank insert for separating the dialling cams.

Figs. 13 and 14 are respectively a circuit diagram of the telephone connections, and a longitudinal elevation partly in section showing the mechanical features of a modified construction of the dialling mechanism whereby alarm messages may be sent to several stations successively.

Figs. 15, 16a and b, 17a and b, and 18a and b, show in plan view and elevation, the components of the cam assembly incorporated in the Fig. 14 construction, for breaking the microphone circuit between successive calls, and for actuating the dialling mechanism at proper intervals in the desired sequence. Fig. 15 shows the collar upon which are assembled the cams Figs. 16 and 18 separated by insert blanks Fig. 17.

Figs. 19a and b show in plan view and sectional elevation, a frusto-conical insert member of the repeat call dialling mechanism of the Fig. 14 assembly.

Figs. 20 to 23 inclusive are modified showings respectively of Figs. 6, 9, 13, and 14, illustrative of alternative switching arrangements.

Figure 3:
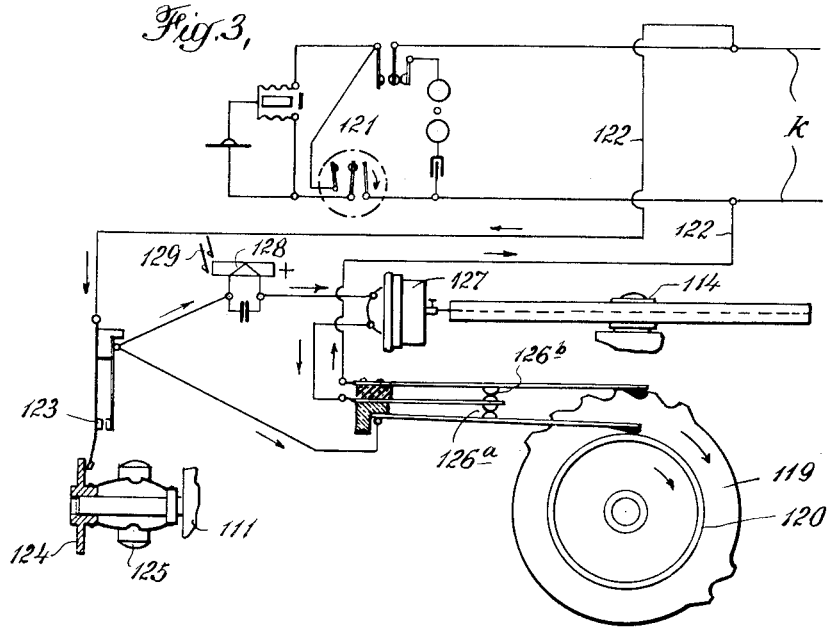
Fig. 3 is a wiring diagram showing the manner in which the dialling mechanism and phonographic message transmitting device of the protective system are associated with a subscriber's telephone line extending to an automatic exchange.

In the embodiment of the apparatus illustrated in Figs. 1 to 3, the protective circuit 101 is normally closed by a plurality of switches 102 located at various points on the premises to be protected and which will be opened in the usual way when such premises are invaded. The protective circuit 101, energized from a source of electrical power supplied to terminals 100, and controlled by a switch 103 having an off position 104, normally energizes an electromagnet 105 to open a switch 106, closure of which completes a circuit over conductor 107 through an electromagnet 108 which, when energized, starts the signaling apparatus in a manner presently to be described. Alternatively energization of electromagnet 108 may be under control of normally open protective circuits such as those including switches 109 and 109', adapted to be closed upon entry of an intruder.

The electromagnet 108 when energized, attracts a lever 110 which starts the motor 111 of the signaling apparatus. The motor in turn, through the medium of the speed reducer 112, rotates the driving spindle 113 of the dialling mechanism, and the spindle 114 of a support for the phonographic record, cylinder or strip, on which is recorded a suitable message of warning to the station dialled that the protected premises are being invaded.

The spindle 115 of the dialling device is axially displaceable. To permit this, its upper end is splined in a quill portion of the spindle 113 of the speed reducer, and is driven by said spindle 113 through the medium of a pin 116 mounted in an axial slot of the spindle 113. The lower end 117 of the spindle 115 is threaded and screws in a socket 118 fixed to the frame of the apparatus. The movement of the spindle of the dialling device is therefore the combination of a rotational one imparted by the spindle 113 of the speed reducer, and a vertical translational movement controlled by the threaded socket 118.

When the spindle 115 has reached the position illustrated in Fig. 2, its driving finger 116 clears the spindle 113 so that movement of said spindle 115 then ceases. To return the dialling device to its initial position, it is only necessary to screw the socket 118 until spindle 115 is returned to its position shown in Fig. 1. The spindle 115 of the dialling device carries one or more dialling cams 119 and a drum 120 to which are imparted its combined rotational and translational movement.

In the Fig. 3 wiring diagram showing the telephone connections, 121 represents the conventional wiring of a subscriber's telephone station arranged for dialling. The subscriber's station is connected over conductors $k$ to an automatic telephone exchange.

The alarm system is connected at a convenient point to the subscriber's line $k$ over conductors 122, included in a circuit traced seriatim through contacts of a normally open switch 123, normally closed contacts of switch 126b, controlled by the aforementioned drum 120, and normally closed contacts of switch 126b, actuated by the dialling cam 119, whereby dialling impulses may be transmitted to line $k$ from the alarm system. Closure of switch 123 is effected during rotation of motor 111, through lateral displacement of the slide-block 124 affixed to the centrifugal governor 125, thus connecting the alarm apparatus to line $k$.

During the dialling operation the contacts of switch 126a are maintained closed by drum 120 in the manner shown in Fig. 1, thereby to short circuit the microphone pick-up 127 of the phonograph mechanism as shown in Fig. 3. Upon completion of the dialling, however, the axial advance of drum 120 opens switch 126a in the manner of Fig. 2, to connect the microphone pick-up 127 in the circuit traced over conductors 122 in order that the alarm message may be transmitted to line $k$ and thence to the station dialled.

Automatic operation of the system to dial a selected station and transmit the alarm message thereto are effected as follows: The alarm mechanism having been set by closure of switch 104, entry of the protected premises opens a switch 102, or closes a switch 109, to energize relay 108 in the manner described. The motor 111 having been started by actuation of lever 110 upon energization of electromagnet 108, the axial displacement of the slide block 124 due to rotation of the centrifugal governor 125, closes switch 123 to complete the circuit traced from line $k$ through the dialling switch 126b. Current from the central office then flows from one side of line $k$ through switches 126a and 126b, both of which are closed, and returns to the other side of line $k$, the microphone pick-up 127 being thus short-circuited. As the teeth of cams 119 in their combined rotational and translational movement pass successively under the push button of switch 126b, the telephone circuit is opened a predetermined number of times and in a dialling sequence adapted to establish connection with the station to be called. The dialling impulses are controlled by the number, shape and location of the teeth on each cam, the number of cams, the speed of rotational and translational movement, etc.

When the dialling device, in the manner explained, is brought to rest in the position of Fig. 2, switch 126a is opened and switch 126b closed to close the circuit through the microphone 127 to the telephone line $k$ in order to permit of transmitting phonographically the alarm message to the called station, connection to which has been established by the dialling operation.

If the telephone system is of the automatic exchange type, the cams 119 and the drum 120 are designed in such manner as to call the required number, i. e., to reproduce automatically the dialling operations of the manual dialling device of the subscriber's telephone set 121. If, however, the telephone is of the manual exchange central office battery type, the dialling cams are not required for the reason the direct current path established between the conductors of line $k$ upon closure of switch 123, will light the pilot lamp before the central office operator, and she will answer in the usual way to complete the call to the desired station in accordance with instructions transmitted phonographically from the microphone pick-up 127.

The apparatus may most expeditiously and without other change be adapted to manual exchange operation by permanently short circuiting the contacts of the dialling switch 126b, as by soldering a lead between the terminals thereof, and by further blocking open contacts 126a, as by insertion of a wedge, to operatively connect the microphone pick-up permanently in the circuit.

In the modification illustrated in Figs. 4 to 13 inclusive, the motor of the apparatus is a mechanical motor whose spring is lodged in the drum 1. The spring re-winding mechanism is shown at 2. The whole apparatus is mounted within a casing 3 which may incorporate a sound proofing material. The crown wheel 4 of the drum drives the various mechanisms of the apparatus through gear trains 5—6, 7—8, 9 and 10. The spindles of the drum and gears are mounted between two mounting plates 11 and 12 which are braced by three struts 13 resiliently mounted on the casing 3 of the apparatus.

The signaling apparatus operates as follows: When one of the contacts 102 or 109 of the protective circuits illustrated in Fig. 1, is actuated, the electromagnet 14, Figs. 4, 5, and 7, is energized and attracts its armature 15 which, through the medium of the pivot lever 16, releases the drop 17, the latter as it falls, depressing the rod 18 below the stop pin 20 fixed on the ledge of the turntable 19 of the phonograph, thus initiating operation of the entire mechanism. The turntable 19 set on the spindle of the pinions 7 and 8 being released, the spring of the drum 1 unwinds driving the various members of the apparatus through the rotation of the crown wheel 4 and of the pinions 5—6, 7—8, 9 and 10.

The telephone connection, Fig. 6, is made for example at any suitable point of the telephone line $k$ extending from the subscriber's set 21 to an automatic exchange. When the driving motor of the protective apparatus is stationary, the circuit of the subscriber's telephone is by way of $k$, $b$, $c$, $l$, that is, through the contacts $b$—$c$ of the two-way switch $b\ c\ d$ of the signaling apparatus. The two-way switch $b\ c\ d$ is controlled automatically by the slide block $h$ of a centrifugal governor 21.

When the motor of the apparatus is started up by the means previously described, the slide block $h$ of the governor rises and lifts the push button 22 of the contact blade $b$. The first circuit $k\ b\ c\ l$ to the subscriber's telephone is then broken while the slide block $h$, continuing on its upstroke, establishes contact between the two upper blades $b\ d$, the telephone line $k$ extending from the central office being then closed by way of $k\ b\ d\ e\ f\ g\ k$, that is through a second two-way switch $e\ f\ g$, controlled by an automatic dialling device $n$ having a helicoidal motion.

The dialling device $n$, illustrated in Figs. 9 and 10, is at this instant in the position of Fig. 9 in which is holds the switch $e\ f\ g$ closed by acting on the push button 23. When, after several seconds' rotation of the dialling device $n$, the push button 23 of the switch encounters the sets of dialling cams 24, the contacts $f\ g$ are broken as each cam tooth passes under the push button 23 at the required rate to actuate the selectors of the exchange, and consequently to call the number of the emergency station sought for. During the dialling operation, however, contacts $e\ f$ remain closed thereby short-circuiting the microphone pick-up $m$ of the phonograph.

When the dialling operation is terminated (position shown in Fig. 10), the contacts $f\ g$ of switch $e\ f\ g$ remain closed, whereas the contacts $e\ f$ are broken, thus establishing the microphone pick-up circuit $k\ b\ d\ r'\ m\ f\ g\ k$. To avoid arcing at the contacts $f\ g$ during the dialling operation the dissipative circuit, comprising condenser 10 in series with damping resistance $r$, is arranged in shunt thereto as shown.

A variable resistance $r'$ may be inserted in the circuit of the microphone pick-up $m$ to adjust, according to the resistance of the line and the voltage of the exchange battery, the signal intensity reproduced at the called station.

As soon as the emergency signal has been emitted for a predetermined time, the motor is stopped by means presently to be described. The slide block $h$ of the governor 21 then returns to its position of rest, first breaking the microphone circuit $k\ b\ d\ r'\ m\ f\ g\ k$, and then remaking the subscriber's telephone circuit $k\ b\ c\ l\ k$, whose line is released.

The spindle 25 of the dialling device $n$, Fig. 10, rotates at predetermined speed in a tapped guide member 26, mounted on the mounting plate 12. It is driven by the pinion 9 through the toothed wheel 6 and rotates in an adjustable step bearing 27. The dialling device $n$ is constituted by a cylindrical member threaded onto the tapped support 26, to which a helicoidal movement is imparted through the medium of a pin 28 secured to the spindle 25, said pin sliding in a suitable slot of the dialling device $n$. The pitch of the helix is determined by the thread of the support 26 onto which the dialling device $n$ is screwed in such wise that the push button 23 of the switch $e\ f\ g$ is pushed back successively by each tooth of the cams 24. Said cams 24 are so cut out that the digit 0, comprising a series of ten interruptions, occupies half the circumference of an individual cam, Fig. 11. In this manner, between each set of interruptions corresponding to the digits of the number called, there occurs between successive digits, a closure (minimum for the digit 0) of the circuit $k\ b\ d\ e\ f\ g\ k$ (Fig. 6) corresponding to an interval of at least half a revolution of the dialling device $n$.

The dialling device $n$ includes as many dialling cams 24 as there are digits in the number of the station called. Each cam is separated from the next one by an insert member 29, Fig. 12. The cams and their insert pieces are centered on the dialling device $n$ and are clamped by a screw 30.

When, after dialling, the dialling device is arrested in the position of Fig. 10, the circuit $k\ b\ d\ r'\ m\ f\ g\ k$ is established. The microphone of the phonograph pick-up $m$ is of standard construction. It is mounted in a casing 31 by means of a screw 32 at the end of an arm 33, mounted to swivel in all directions on a pivotal support 34 carried by the plate 12 as shown in section in Fig. 5.

A phonograph diaphragm stylus support is mounted on the casing 31. The sound vibrations transmitted by the emergency signal call recorded on the record 36 are transmitted to the carbon membrane 37 of the microphone by the screw 38 of the support 35 which bears on the carbon membrane through the medium of a leaf 39 with a pressure that can be adjusted. The screw 38 passes through a resilient membrane 40 affixed to the bottom of the casing 31, which membrane attenuates stray vibrations in the telephonic transmission of the call recorded.

The call is recorded on the surface of the record 36 for a width corresponding to a revolution of the drum 1, that is to say, approximately 40 turns for the apparatus illustrated herein. When the needle has traversed these forty turns, a finger 41 fixed on a cursor 42 of the arm 33 encounters a cam 43 rotating with the drum 1. Said cam 43 is provided on one side with an inclined surface so that as the cam passes under the finger 41 the latter is engaged by the cam surface and raised an amount sufficient to lift the needle clear of the record. Thereupon, the tapered edge of the finger 41 is engaged by a vertical portion of the cam, and as the latter continues its movement the finger and the arm 33 are moved laterally by the cam action between the tapered edge of the finger and the vertical portion of cam 43. When the needle is in position over the starting place on the record, the end of finger 41 moves off the inclined surface of the cam and the arm drops to its original position. The call recorded is thus repeated at each revolution of the drum 1. By moving the cursor 42 angularly or axially with respect to the arm 33, the lift and angular displacement of the needle 44 of the microphone are adjusted. The knob 45 enables the cursor 42 to be clamped on its spindle.

To restrict the telephone signal to a predetermined time duration or number of signals, the drum 1 carries laterally one or more projecting fingers 46 which drive a ratchet wheel 47 (Figs. 8 and 8a) mounted on a spindle 48 provided with a tapped head 50 which screws into a support 49 fixed under the upper plate 11. When the screw head 50 abuts the plate 11, the ratchet 47 arrests the driving finger 46, and hence the drum 1 and the whole apparatus. In this manner, untimely breaking of the telephone circuit through the switch b c d is avoided due to oscillations of the slide block h of the centrifugal governor when the motor runs down to the extent that the spring no longer supplies a sufficient torque.

The rated speed of the whole apparatus is regulated through the medium of the lever 51 (Fig. 4) which limits the up stroke of the slide block h of the governor 21 through a stop 52 at the end of the lever 51.

When the apparatus is arranged to warn the same emergency station or several different stations, several times in succession, the telephonic wiring diagram, Fig. 13, is the same as for a single call, but with the addition of a switch o—p included in the circuit of the microphone pick-up m, and controlled at predetermined intervals by one or more cams 54 (Fig. 14).

The mechanism allowing successive calls to be made is illustrated by way of example, in Fig. 14, for three successive calls to emergency stations, whose telephone numbers each comprise two digits. The automatic dialling device n, Fig. 14, shown in sectional elevation, includes three sets each of two dialling cams 24, separated by the insert members 29. Each set of cams is separated by inverted frusto-conical insert members 55.

The pinion 9 driving the shaft 25 of the dialling device is mounted on a sleeve 56 freely rotatable in cylindrical bearings of the support 26 of the dialling device. The pinion 9 carries on its lower face one or more driving fingers 57, while the spindle 25 of the dialling device has mounted on an appropriate collar 58, splined to the shaft 25, another driving finger 59 in alignment with fingers 57.

The shaft 48 of the stopping mechanism is extended below the ratchet wheel 47 to receive the collar 60 whose angular position on the spindle is controlled by a needle screw. On the collar 60 are assembled cams 54 controlling the switch o—p (Fig. 13), and cams 61 controlling the movement of the dialling device n through the medium of a clutch lever 62 pivoted on the spindle 63.

The repeat call signaling apparatus operates as follows: When the fall of the shutter 17 (Fig. 7) has set the apparatus in motion through the means previously described, the adjustable screw 64 of the lever 62 encounters the first cam 61 controlling the dialling device n after a time interval determined by the position of the driving fingers 46 of the ratchet 47 on the drum 1. At this moment, the end 65 of the lever 62 will raise the spindle 25 of the dialling device n against the depressing action of spring 66, one of the driving fingers 57 of the pinion 9 will meet, as it rotates, the corresponding finger 59 of the clutch disc 58 of the spindle 25. The spindle 25 will then start rotating, driving, through the means previously described, the dialling device n, for a length of time determined by the length of the cam 61 and sufficient to assure dialling of the digits, two in the example illustrated, of the first station called.

As the teeth of dialling cams 24 pass successively under the push button 23 of switch e f g (Fig. 13), the switch is actuated in the same manner as previously described for the case of a single call. When the first telephone number has been called, the cam 61 releases the screw 64, while the spring 66 fixed on the upper plate 11 of the apparatus thrusts the spindle 28 downwardly into its position of rest. The dialling device will then be locked, the push button 23 on the switch e f g dropping into the groove provided by the first frusto-conical insert 55. This causes the switch contacts g f to remain closed and the contacts f e to be opened, thereby connecting the microphone pick-up m to line k for transmitting the alarm message to the first station called.

The ratchet wheel 47, continuing its intermittent helicoidal motion, will elevate with it the collar 60 until the push button 53 of switch o—p encounters the first cam 54. When this occurs, the telephone circuit is broken at o—p and the first call will terminate to release line k at the central office. This first break of the circuit will last for a time corresponding to the length of the cam 54, then the telephone circuit will be re-established at o—p. After a time interval determined by the thickness of the first insert piece 67 and the angular position of the collar 60, the second cam 61 will encounter the screw 64 causing the dialling device to be moved a second time in the manner described, to make the second call. The second conical insert member 55 will, in the manner described, thereafter then open contacts e f to connect the pick-up m to line k for transmission of the alarm message to the second station termination of which is effected by the elevation of push button 53 by the second cam 54. This sequence of operations will be repeated in the same manner for the third or any greater number of calls.

The duration of the last call is regulated by the screw 68, the end 69 of which will act as a stop for the advancing head 50 of the spindle 48, to prevent further rotation of the drum 1. Thereupon contacts b d of switch b c d will open to disconnect the alarm apparatus from line k, which will then be reconnected to the subscriber's station 21 through switch contacts b c.

In the constructions described thus far a single three contact switch, such as e—f—g, Figs. 6, 9, 13, and 14, serves the dual role of transmitting the dialing impulses and connecting the microphone pick-up m to the telephone line k subsequent to dialling. Thus, during transmission of the dialling impulses effected through alternate break and make of contacts f—g, contacts e—f remain closed to short circuit the microphone pick-up m. Upon completion of the dialling, however, contacts f—g must be maintained closed, and contacts e—f open to connect the microphone pick-up m to line k for transmission of the alarm message.

This selective actuation of contacts f—g on the one hand and contacts e—f on the other necessitates rather careful and precise adjustments of the resilient blades supporting the respective contacts e, f and g. To avoid the necessity for this careful regulation, the circuits and mechanical embodiments of Figs. 6, 9, 13, and 14 may be modified as shown in Figs 20 and 23 inc., respectively, wherein there is employed a two contact switch f—g for dialling only, and a separate three contact switch s—e—t for connecting the microphone m to line k and opening the dissipative path w, r.

Operation of the dialling switch f—g in Figs. 20-23 inclusive is the same as that described for the dialling contacts f—g in connection with Figs. 6, 9, 13, and 14. In Figs. 20 and 21, adapted to the dialling of but a single station, the switch s—e—t is mounted on the base plate 12 with the resilient contact blade s extending beneath drum $n$. At the conclusion of the dialling operation when the drum in its translational movement has reached a position corresponding to that of Fig. 10, the lower portion of the drum will upon abutting the extension of switch blade $s$, open the switch thereby to connect microphone $m$ to line $k$ and at the same time open the dissipative path $w, r$.

In the construction of Figs. 22 and 23, adapted to multiple station selection, the actuation of switch $s$—$e$—$t$ is controlled by the axially displaceable spindle 25 which operates the dialling drum $n$ intermittently in the manner heretofore described in connection with Fig. 14. In Fig. 23 the resilient extension of switch blade $s$, corresponding to spring 66 of Fig. 14, maintains the spindle 25 normally depressed and the switch $s$—$e$—$t$ normally open, thereby connecting the microphone $m$ to line $k$, and opening the dissipative path $w, r$. It will be observed, however, that during each dialling operation when spindle 25 is elevated by the cam actuation described of lever 65, the contacts $s$—$e$—$t$ are closed to short circuit the microphone $m$, and to connect the dissipative path $w, r$ across the dialling contacts $f$—$g$.

In the construction of Fig. 23 the annular blanks 55 replace the conical inserts 55 of the Fig. 14 arrangement, required in the latter instance to open the microphone short circuiting path between dialling operations at contacts $e$—$f$. The conical inserts are not required in the Fig. 23 modification due to the fact that the microphone path is under exclusive control of spindle 25.

In order to clear the telephone line $k$—$l$ if it should be busy, i. e., connected at the central office to a distant station, at the time the alarm mechanism is actuated, the drum $n$ may, as shown by way of example in Fig. 21, be provided below the dialling cams 24, with a collar 70. As the drum, upon actuation, travels downwardly the switch 23, upon encountering collar 70, opens, thereby opening the line $k$ to disconnect at the central office any line connected thereto. In this way it is assured that line $k$ will be free for connection to the station selected immediately thereafter by the dialling cams 24. It will be understood that this initial line clearing arrangement of Fig. 21 may be applied to any of the remaining modifications described herein.

The multiple station dialling systems of Figs. 14 and 23 may, if desired, be arranged to dial the central office operator for a final selection. This will assure relaying of the alarm message to proper authorities in the event of failure of the apparatus due to possible busy lines, etc., to establish connection with the selected stations.

We claim:

1. In an alarm system, an automatic exchange telephone line, a protective circuit, a motor, means responsive to electrical disturbance of said circuit for starting said motor, a dialling switch, a helicoidally advancing drum operated by said motor, spaced cam disks on said drum for successively actuating said switch to automatically connect said line to a particular station, a phonographic device for sending an alarm message, and a second switch spaced from said first switch including a movable element normally in position to disconnect said phonographic device from the line, said element being disposed in the path of said drum in position to be positively engaged and displaced thereby subsequent to dialling to connect the phonographic device to the line.

2. In an alarm system, an automatic exchange telephone line, a protective circuit, a motor, means responsive to disturbance in said circuit for starting the motor, a dialling switch, a helicoidally advancing drum operated by said motor, spaced cam discs on said drum for successively actuating said dialling switch to automatically connect said line in sequence to a plurality of stations, cam actuating clutch means including a shaft axially displaceable within and intermittently driving said drum for effecting successive station selection, a phonographic device for sending an alarm message over said line, and a second switch for connecting and disconnecting said phonographic device to the line including an element disposed in position to be engaged and displaced by said shaft upon axial movement thereof in one direction, said second switch operating upon displacement of said element to control the connection of said device to said line.

3. In an alarm system in combination, a subscriber's telephone line, a protective circuit, a motor under control of said protective circuit, means actuated by said motor including a phonographic device for sending an alarm message over said telephone line, said device including a pivotally supported pick-up element traversing a record to transmit said message, and means causing repetition of said message comprising, a member rotated continuously by said motor at the rate of one revolution for each playing of the record, a lug affixed to said pick-up support, and a cam driven by said rotatable member having an inclined surface adapted to engage said lug to elevate the support and means on said inclined surface adapted to engage a portion of said lug to angularly displace the support.

4. In combination with a telephone line extending to a central office, an alarm system comprising, a protective circuit, a motor, means responsive to disturbance of said circuit for starting the motor, means actuated thereby for signaling the central office, a phonographic device including a pivotally supported pick-up traversing a record for sending an alarm message over said line, means automatically producing repetition of said message comprising, a member rotated continuously by said motor at the rate of one revolution for each playing of the record, a lug affixed to said pick-up support, and a cam affixed to said rotatable member having a leading upwardly-inclined surface adapted to engage the bottom of said lug to elevate the support and a substantially vertical abutment at the top of said inclined surface adapted to engage a cooperating cam surface on the edge of said lug to angularly displace the support.

5. In combination with a line connecting a telephone set with a central office, an alarm system distinct from said set and comprising a protective circuit, a motor, means responsive to disturbance of said circuit for starting the motor, means responsive to disturbance of said circuit for disconnecting said set and connecting the alarm system to said line, a mechanism actuated by said motor for opening the line for a predetermined time interval to permit clearing of the line to the central office, and means for thereafter signaling the central office and sending an alarm message over said line.

6. In combination with a line connecting a telephone set with an automatic exchange station, an alarm system distinct from said set and comprising a protective circuit, a motor, means responsive to disturbance of said circuit for starting the motor, a centrifugally actuated switch operated by said motor for disconnecting said set and connecting the alarm system to said line, means actuated by said motor for opening the line for a predetermined time interval to permit clearing of the line to the automatic exchange station, impulsing means for automatically connecting said line to a preselected station, and a phonographic device for thereafter sending an alarm message over said line.

7. In combination with a line connecting a telephone set with an automatic exchange station, an alarm system distinct from said set and comprising a protective circuit, a motor, means responsive to disturbance of said circuit for starting the motor, means for disconnecting said set and connecting the alarm system to the line upon disturbance of said circuit, dialling means actuated by said motor and including a helicoidally advancing cam drum, a switch for opening and closing the line, a substantially continuous cam on said drum for actuating said switch to open the line for a predetermined time interval, thereby permitting clearance of the line to the exchange station, a plurality of spaced cam discs on said drum adapted to successively operate said switch to connect said line to a particular station, and a phonographic device for thereafter sending an alarm message over said line.

8. In an alarm system, a telephone line extending to a central office, a protective circuit, a motor, means responsive to electrical disturbance of said circuit for starting the motor, a dialling switch, means movable in response to the starting of said motor for successively actuating said switch to automatically signal the central office, a phonographic device for sending an alarm message, and a second switch spaced from the first switch for connecting and disconnecting said phonographic device to the line including a movable element disposed in the path of said means in position to be positively engaged thereby upon movement of said means in one direction after dialling, said switch operating upon engagement of said means with the element to control the connection of said phonographic device to the line.

9. In an alarm system, a telephone line extending to a central office, a protective circuit, a motor, means responsive to electrical disturbance of said circuit for starting the motor, a dialling switch including a movable contact element, means movable in response to the starting of said motor for successively actuating said movable element to automatically signal the central office, a phonographic device for sending an alarm message, and a second switch for connecting and disconnecting said device to the line including a movable contact element spaced from said first element in position to be positively engaged by said means during the operating thereof to control the connection of said device to the line.

10. An alarm system comprising an automatic exchange telephone line, a protective circuit, means responsive to disturbance of said circuit for connecting the alarm system to the line, means for connecting said line to a particular station and thereafter sending an alarm message over the line, and means for opening the line for a predetermined time interval to permit clearing of the line to the central office upon connection of the system to the line and before the sending of an initial alarm message over the line.

MARCEL SPIRO.
JEAN EDOUARD TUSCHER.